United States Patent Office 2,745,846
Patented May 15, 1956

2,745,846
EPOXIDIZED ACYL RICINOLEATES

Joachim Dazzi, Dayton, Ohio, assignor to Monsanto Chemical Company, St. Louis, Mo., a corporation of Delaware No Drawing. Application January 28, 1952,
Serial No. 268,686

12 Claims. (Cl. 260—348)

The present invention relates to derivatives of ricinoleic acid and more particularly provides new epoxidized, acylated ricinoleates, methods of producing the same and vinyl chloride polymers plasticized with the new ricinoleates.

According to the invention there are provided new and valuable ricinoleic acid derivatives having the formula:

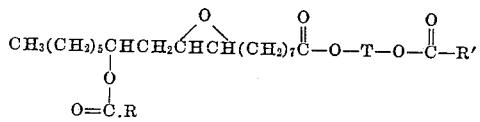

in which R and R' are alkyl radicals of from 1 to 5 carbon atoms and T is selected from the class consisting of alkylene radicals of 2 to 6 carbon atoms, alkyleneoxyalkylene radicals of from 3 to 8 carbon atoms, and polyalkyleneoxyalkylene radicals of from 6 to 10 carbon atoms.

Compounds having the above formula may be readily prepared by contacting an acylated ricinoleate having the formula:

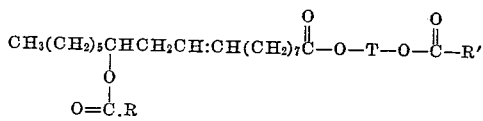

with an oxidizing agent selected from the class consisting of solutions of hydrogen peroxide in a fatty acid of from 1 to 4 carbon atoms, fatty per acids of from 1 to 4 carbon atoms, and perbenzoic acid.

Acylated ricinoleates having the above formula and useful for the present purpose are known compounds, some of which are at present available in commercial quantities, which are prepared generally by condensation of an acylated ricinoleic acid, e. g. 12-acetoxy-9-octadecenoic acid with an alkylene glycol or a polyalkylene glycol, e. g., ethylene glycol or diethylene glycol to yield the hydroxyalkyl acyloxyoctadecenoate or the (hydroxyalkoxy)alkyl acyloxyoctadecenoate, e. g., 2-hydroxyethyl 11-acetoxy-9-octadecenoate or (2-hydroxyethoxy)ethyl 12-acetoxyoctadecenoate, and reaction of the hydroxy ester with a fatty acid or fatty acid anhydride of from 1 to 6 carbon atoms, e. g., acetic acid to yield the acyloxyalkyl acyloxy-9-octadecenoate or the (acyloxyalkoxy)alkyl acyloxy-9-octadecenoate, e. g. 2-acetoxyethyl 12-acetoxy-9-octadecenoate or 2-(2-acetyloxyethoxy)ethyl 12-acetoxy-9-octadecenoate.

As examples of epoxidized ricinoleic acid derivatives provided by the present invention may be mentioned 2-acetoxyethyl 9,10-epoxy-12-acetoxyoctadecanoate, 2-propionyloxyethyl 9,10-epoxy-11-acetoxyoctadecanoate, 3-butyryloxypropyl 9,10 - epoxy - 12 - propionyloxyoctadecanoate, 2 - (2 - acetoxyethoxy)ethyl 9,10 - epoxy - 12 - valeroyloxyoctadecanoate, 3 - (3 - acetoxypropoxy)-propyl 9,10 - epoxy - 12 - acetoxyoctadecanoate, 2 - 2 - (2 - acetoxyethoxy)ethoxy ethyl 9,10 - epoxy - 11 - acetoxyoctadecanoate, etc.

Epoxidation of the acyloxyalkyl acylricinoleates or of the acyloxyalkoxyalkyl acylricinoleates is carried out by contacting the ricinoleate with the oxidizing agent and allowing the resulting mixture to stand at ordinary or moderately elevated temperatures until formation of the epoxide. This may be evidenced by lack of unsaturation in the reaction product or noting the oxygen content of the product. Oxidizing agents useful for the present purpose, as disclosed above, are peroxidic agents selected from the class consisting of solutions of hydrogen peroxide in fatty acids of from 1 to 4 carbon atoms, fatty per acids of from 1 to 4 carbon atoms and perbenzoic acid. As examples of suitable oxidizing agents may be mentioned solutions of hydrogen peroxide in formic acid, acetic acid, propionic acid, butyric acid, and benzoic acid, etc., or such per acids as performic acid, peracetic acid, perpropionic acid, perbutyric acid, or perbenzoic acid.

The present epoxidized acyloxyalkyl acylricinoleates are stable, high-boiling materials which range from clear, substantially colorless viscous liquids to waxy or crystalline solids. They are advantageously employed for a variety of industrial purposes, for example, as textile-treating agents and as lubricant additives, but they are particularly valuable as plasticizers for vinyl chloride polymers. While the acyloxyalkyl acylricinoleates are generally incompatible with vinyl chloride polymers, the present epoxy-derivatives thereof are completely compatible with such polymers and show no exudation of plasticizer even at plasticizer content of up to 50 per cent. Although the quantity of plasticizer will depend upon the particular polymer to be plasticized and upon its molecular weight, it is generally found that compositions having from 5 per cent to 50 per cent by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units from one to 100. The hardness of the composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the low temperature limit of the plasticized compositions' usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating or inefficient because upon volatilization the plasticized composition becomes stiff and hard. The test for plasticizer volatility herein employed is that described by the American Society for Testing Materials under the designation D-744-44T.

The invention is further illustrated, but not limited, by the following examples:

Example 1

2 - (2 - acetoxyethoxy)ethyl 12 - acetoxy - 9 - octadecenoate was prepared by esterification with acetyl chloride or acetic anhydride of the commercially available 2 - (2 - hydroxyethoxy)ethyl 12 - acetoxy - 9 - octadecenoate. Epoxidation of the 2-(2-acetoxyethoxy)-ethyl 12-acetoxy-9-octadecenoate was effected as follows:

A mixture consisting of 94 g. (0.2 mole) of the ester and 3.4 g. of 90% formic acid (0.067 mole HCOOH) was placed in a 500 ml. flask equipped with stirrer, condenser, thermometer and dropping funnel. During a period of 20 minutes there was added to this mixture 13.6 g. of an aqueous hydrogen peroxide solution which had been prepared by mixing equal parts by weight of water and 90% hydrogen peroxide. After allowing the resulting reaction mixture to stand for 24 hours at a temperature of 23-27° C., it was diluted with 20 ml. of 5% aqueous sodium bicarbonate and washed to neutral. The washed product was then dried and heated for 2 hours in a nitrogen atmosphere at a pressure of 2 mm. of mercury and a bath temperature of 100° C. The heated product was stirred for 30 minutes with 1 g. of clay and a little filter aid, and then filtered to yield 89.9 g. of the clear, yellowish liquid 2-(2-acetoxyethoxy)-ethyl 9,10-epoxy-12-acetoxyoctadecanoate, $N_D^{25}$ 1.4635. Testing of the product for oxirane-oxygen content by the method described on p. 414 of volume 19 (1947) of "Industrial and Engineering Chemistry, Analytical Election" showed the presence of the epoxy radical.

Example 2

Sixty parts of polyvinyl chloride and 40 parts by weight of the epoxidized product of Example 1 were mixed on a rolling mill to a homogeneous blend. During the milling there was observed substantially no fuming or discoloration. A molded sheet of the mixture was clear and transparent and substantially colorless. Testing of the molded sheet for low temperature flexibility, according to the testing procedure described above, gave a value of minus 43.5° C., which value denotes extremely good low temperature properties. Tests on the volatility characteristics of the plasticized composition gave a value of 1.19 per cent which shows very good retention of plasticizer and indicated good temperature characteristics of the composition. When subjected to heat at a temperature of 325° F. for a period of 30 minutes the clarity and color of the molded product was substantially unchanged.

Similar testing of the corresponding un-epoxidized product, i. e., the 2-(2-acetoxyethoxy)ethyl 12-acetoxy-9-octadecenoate showed it to be incompatible with polyvinyl chloride.

Instead of the epoxidized 2-(2-acetoxyethoxy)ethyl 12-acetoxy-9-octadecenoate employed in Example 1, other epoxidized (acyloxyalkoxy)alkyl or acyloxyalkyl acyloxy-octadecenoates may give similarly valuable plasticized polyvinyl chloride compositions. Thus, by employing 40 parts by weight of 2-acetoxyethyl 9,10-epoxy-12-acetoxy-octadecanoate, of 3-butyryloxypropyl 9,10-epoxy-12- acetoxyoctadecanoate, or of 3-(3-acetoxypropoxy)propyl 9,10-epoxy-12-valeroyloctadecanoate with 60 parts by weight of polyvinyl chloride or with 60 parts by weight of a vinyl chloride-vinyl acetate copolymer known to the trade as "Vinylite," there may be obtained clear, colorless compositions of very good flexibility and stability.

While the above example shows only a composition in which the ratio of plasticizer to polymer content is 40:60, this ratio being employed in order to get comparable efficiencies, the content of ester to polyvinyl chloride may be widely varied depending upon the properties desired in the final product. For many purposes a plasticizer content of, say, from only 10 per cent to 20 per cent is preferred. The present esters are compatible with polyvinyl chloride over a wide range of concentrations, up to 30 per cent of esters based on the total weight of the plasticized composition yielding desirable products.

Although the invention has been described particularly with reference to the use of the present epoxide derivatives of ricinoleic acid as plasticizers for polyvinyl chloride, these compounds are advantageously employed also as plasticizers for copolymers of vinyl chloride, for example, the copolymers of vinyl chloride with vinyl acetate or vinylidene chloride. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; in some instances the present plasticizers also behave as do other known stabilizers in plasticized compositions. Inasmuch as the present esters are substantially unreactive with the commercially available heat and light stabilizers which are commonly employed with polyvinyl chloride or copolymers thereof, the presence of such materials in the plasticized products does not impair the valuable properties of the present esters. The present esters are of general utility in softening vinyl chloride polymers. They may be used as the only plasticizing component in a compounded vinyl chloride polymer or they may be used in conjunction with other plasticizers.

What I claim is:

1. Epoxidized acylricinoleates having the formula:

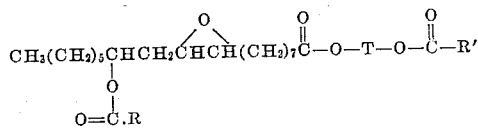

in which R and R' are alkyl radicals of from 1 to 5 carbon atoms and T is selected from the class consisting of alkylene radicals of from 2 to 6 carbon atoms, alkyleneoxyalkylene radicals of from 4 to 8 carbon atoms.

2. Acyloxyalkyl 9,10-epoxy-12-acyloxyoctadecanoates in which each acyl group has from 2 to 6 carbon atoms and in which the alkyl group has from 2 to 6 carbon atoms.

3. Esters of (hydroxyalkoxy)alkyl 9,10-epoxy-12-acyloxyoctadecanoates and fatty acids of from 2 to 6 carbon atoms, the (hydroxyalkoxy)alkyl radical of said esters containing from 4 to 8 carbon atoms and the acyloxy portion of said esters containing from 2 to 6 carbon atoms.

4. Esters of (hydroxyalkoxy)olkoxy alkyl 9,10-epoxy-12-acyloxyoctadecanoates and fatty acids of from 2 to 6 carbon atoms, the (hydroxyalkoxy)alkoxy alkyl radical of said esters containing from 6 to 10 carbon atoms and the acyloxy portion of said esters containing from 2 to 6 carbon atoms.

5. 2-acyloxyethyl 9,10-epoxy-12-acetoxyoctadecanoates in which the 2-acyloxyethyl radical contains from 4 to 8 carbon atoms.

6. 2-acetoxyethyl 9,10-epoxy-12-acetoxyoctadecanoate.

7. 2 - (2 - acetoxyethoxy)ethyl 9,10-epoxy-12-acetoxyoctadecanoate.

8. The method of preparing epoxidized ricinoleic acid derivatives which comprises contacting an acylated ricinoleate having the formula:

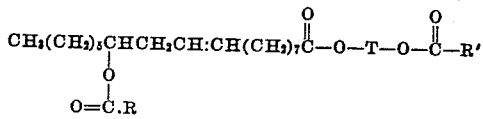

in which R and R' are alkyl radicals of from 1 to 5 carbon atoms and T is selected from the class consisting of alkylene radicals of from 2 to 6 carbon atoms, alkyleneoxyalkylene radicals of from 4 to 8 carbon atoms, with an agent selected from the class consisting of solutions of hydrogen peroxide in a fatty acid of from 1 to 4 carbon atoms, and per compounds selected from the class consisting of fatty per acids of from 1 to 4 carbon atoms and perbenzoic acid, and allowing the resulting mixture to stand until epoxidation of said ricinoleate has occurred.

9. The method of preparing acyloxyalkyl 9,10-epoxy-12-acyloxyoctadecanoates which comprises contacting an acyloxyalkyl 12-acyloxy-9-octadecenoate in which the acyloxyalkyl radical has from 4 to 12 carbon atoms and the acyloxy radical has from 2 to 6 carbon atoms with a solution of hydrogen peroxide in a fatty acid of from 1 to 4 carbon atoms, and allowing the resulting mixture to stand until epoxidation of said octadecenoate occurred.

10. The method of preparing (acyloxyalkoxy)alkyl 9,10-epoxy-12- acyloxyoctadecanoates which comprises contacting an (acyloxyalkoxy)alkyl 12-acyloxy-9-octadecenoate in which the (acyloxyalkoxy)alkyl radical has from 6 to 14 carbon atoms and the acyloxy radical has from 2 to 6 carbon atoms, with a solution of hydrogen peroxide in a fatty acid of from 1 to 4 carbon atoms and allowing the resulting mixture to stand until epoxidation of said octadecenoate has occurred.

11. The method of preparing 2-acetoxyethyl 9,10-epoxy-12-acetoxyoctadecanoates which comprises contacting 2-acetoxyethyl 12-acetoxy-9-octadecenoate with a solution of hydrogen peroxide in formic acid and allowing the resulting mixture to stand until formation of said epoxy compound has occurred.

12. The method of preparing 2-(2-acetoxyethoxy)ethyl 9,10 - epoxy - 12 - acetoxyoctadecanoate which comprises contacting 2-(2-acetoxyethoxy)ethyl 12-acetoxy-9-octadecenoate with a solution of hydrogen peroxide in formic acid and allowing the resulting mixture to stand until formation of said epoxy compound has occurred.

References Cited in the file of this patent
UNITED STATES PATENTS

| | | |
|---|---|---|
| 2,411,762 | Swern | Nov. 26, 1946 |
| 2,458,484 | Terry | Jan. 4, 1949 |
| 2,518,442 | Scheiderbauer | Aug. 15, 1950 |
| 2,559,177 | Terry | July 3, 1951 |
| 2,567,930 | Findley | Sept. 18, 1951 |
| 2,569,502 | Swern | Oct. 2, 1951 |
| 2,591,368 | McCarthy | Apr. 1, 1952 |
| 2,592,034 | Himsworth | Apr. 8, 1952 |